Patented Nov. 2, 1943

2,333,283

UNITED STATES PATENT OFFICE 2,333,283

ADMINISTRATION CAPSULE

Wilbert Moody Wilson, Beaver, Pa.

No Drawing. Application December 11, 1940,
Serial No. 369,558

3 Claims. (Cl. 167—83)

This invention relates to an administration capsule capable of retaining colloidal preparations of iodine and bromine for release in the intestinal tract of fowls or mammals.

Primarily considered, I provide a capsule suitable for the retention and administration of the colloidal preparations of iodine which are commonly termed "colloidal iodine." Difficulties are encountered in administering that medicine, which is valuable as a vermicide and as a general intestinal antiseptic and astringent, and which has its chief use in veterinary medicine. Further difficulty is encountered in preparing dosages of that medicine for distribution and use. Colloidal iodine if placed in the gelatin capsules commonly used for medicinal administration, destroys the capsule with great rapidity. In veterinary practice it has been usual to introduce iodine into the intestines of mammals and the gizzards of fowls by means of catheters. That procedure is time-consuming and is frequently injurious to the animal receiving the treatment. It requires measurement of the dosage at the place and time of administration.

I have discovered that colloidal iodine may be put up in predetermined dosages in capsules which comply with all the requirements for such use. Those requirements are exacting. As a pre-requisite, the material of the capsule must not be reactive with iodine in its concentrated colloidal form. The capsule must have sufficient strength and rigidity to retain its form and remain unbroken by handling, in shipment, and during its administration, and at the same time must possess sufficient plasticity to permit it readily to be ingested without injury to the living being into the body of which it is introduced.

Colloidal iodine, when administered, performs its useful functions in the posterior digestive tract rather than in the anterior digestive tract of the animal treated. It does not effectively perform its intended functions if it is liberated from the capsule in the stomach of a mammal, or in the crop or the glandular stomach of a fowl. If so liberated, there is a tendency for the effectiveness of the iodine to be decreased by neutralizing reaction with proteins, or by the action of the stomach secretions. It is thus highly desirable that the capsule be capable of withstanding the action of acids of the nature and in the concentration in which they occur in the stomachs and in the other anterior digestive organs of mammals and fowls, and that it be capable of withstanding the other digestive agents and organisms commonly there present.

I am aware that administration capsules have been made of gelatin and other readily affected substances which are coated with a substance capable of resisting body fluids. Such capsules, however, are not capable of long-continued retention of colloidal iodine and similar medicinal preparations of high reactivity. It is further important that the resistances of the capsule be inherent in its fundamental substance rather than that it be imparted by an applied coating, in order that the functioning of the capsule may be uniform and predictable. I am also aware that it has been proposed to coat pills, or form capsules, for the liberation of medicines in the intestinal tract, of plastic compositions containing free carboxyl groupings susceptible of disintegration under the relatively dilute alkaline juices in the intestinal tracts of mammals and fowls, but capable of resisting the action of stomach acids. Because of the free carboxyl groupings which render such plastic compositions susceptible to reaction with the dilute alkaline juices of the intestines, they are incapable of retaining colloidal preparations of iodine and other halogens.

I have discovered that I may make an administration capsule purposed specifically for the administration of colloidal iodine and bromine, and useful for the administration of other remedial, tonic, or nutritional substances of high reactivity, which complies with all of the above requirements. This I do primarily by making the capsule of suitable plastic composition which, being approximately inert, has long-continued resistance to colloidal iodine, and which is resistant to the digestive juices and decomposing agents in the stomachs of mammals and in the crops and glandular stomachs of fowls; but which is susceptible of disintegration or decomposition sufficient to liberate its contents in the posterior digestive tracts of fowls or mammals. I, therefore, make my capsule of a plastic composition consisting essentially of plastic ingredients which possess approximate neutrality and approximate chemical saturation; and which, by virtue of their chemical saturation and approximate neutrality, are relatively inert and enduringly resistant to colloidal preparations of iodine and bromine. As exemplary of the physical embodiment of my invention, I form, as by molding or extrusion, a capsule of two telescoping elements in the conventional form in which administration capsules are commonly made; and utilize as the material of the capsule a plastic composition comprising an approximately neutral and approximately chemically saturated cellulose ether, plasticized by a plasticizing material which also approximates neutrality and saturation.

Typically I use the cellulose ether, ethyl cellulose, as the cellulosic ingredient of my plastic composition, but may use the other cellulose ethers, such as benzyl cellulose. I plasticize the cellulose ether with an approximately neutral plasticizer for cellulose esters and ethers, such as di-butyl phthalate, di-amyl phthalate, ethyl stearate, or the various aromatic phosphate plasticizers of low toxicity, or with methyl abietate.

Desirably I use an aromatic phosphate plasticizer, such as di-(para-tert-butyl-phenyl) mono-phenyl phosphate, di-phenyl mono-(ortho xenyl) phosphate, di-(ortho xenyl) mono-phenyl phosphate, tri-(para tert-butylphenyl) phosphate, or di-(para tert-butylphenyl) mono-(5-tert-butyl-2-xenyl) phosphate. Of these I have found most generally useful for my purpose di-phenyl mono-(ortho xenyl) phosphate and di-(ortho xenyl) mono-phenyl phosphate. This is because they give good flexibility, coupled with adequate tensile strength when used to plasticize the cellulose esters and ethers. Some proportion of di-(para tert-butylphenyl) mono-(5-tert-butyl-2-xenyl) phosphate may be added to other plasticizers, to increase the hardness of the composition.

My preferred formulae thus comprise ethyl cellulose and either di-phenyl mono-(ortho xenyl) phosphate or di-(ortho xenyl) mono-phenyl phosphate. I may give the following examples of making telescoping administration capsules, using formulae comprising those ingredients.

Example No. 1

Taking 20 grams of ethyl cellulose having a viscosity of 250 centerpoises in a 5% solution at 25° C. I dissolved it in 75 c. c. of a mixed solvent composed 65% of toluene and 35% of ethyl alcohol. This I allowed to stand until the ethyl cellulose had dissolved completely in the solvent. This requires from two to three days. I then added 5 c. c. of ethyl acetate to clear the solution. I then added to the solution 5 c. c. of di-(ortho xenyl) mono-phenyl phosphate.

The solution, including the plasticizer was poured upon, and allowed to level off on, a smooth surface. Upon evaporation of the solvent, I obtained a sheet of plastic composition, which sheet I molded into the parts of the telescoping capsules.

Example No. 2

Mixing 20 grams of ethyl cellulose of the same viscosity as in Example No. 1 with 5 c. c. of di-(ortho xenyl) mono-phenyl phosphate and 5 c. c. of ethyl acetate, I worked these components on rolls at a temperature of about 180° F. to 200° F. until a homogeneous composition was formed. The working required about 4 to 5 hours.

The plastic composition was formed as a sheet of the desired thickness for molding into the parts of telescoping capsules, by adjusting the spacing of the rolls after the homogeneous composition had been formed.

Example No. 3

The same materials and procedure as in Example No. 1 were used and followed, except that the plasticizer used was di-phenyl mono-(ortho xenyl) phosphate.

Example No. 4

The same materials and procedure as in Example No. 2 were used and followed, except that the plasticizer used was di-phenyl mono-(ortho xenyl) phosphate.

Example No. 5

Taking 20 grams of ethyl cellulose having a viscosity of about 250 centerpoises in 5% solution at 25° C. I dissolved it in 80 c. c. of solvent composed 75% of toluene and 25% of ethyl alcohol, allowing the mixture to stand for from 2 to 3 days until solution was complete. I then added 11 c. c. of ethyl acetate to clear the solution and added 14 c. c. of di-(ortho xenyl) mono-phenyl phosphate. The solvent was evaporated, and a sheet was formed, as in Example No. 1. Capsules made from a sheet of this material are more pliable than those made in accordance with the preceding examples.

Example No. 6

The ingredients of Example No. 5, excluding the solvent, were worked on hot rolls as in Examples Nos. 2 and 4.

Examples Nos. 7 and 8

The composition of Examples No. 5 and No. 6 was made up as in either of those examples, save that the plasticizer consisted of 10 c. c. of di-phenyl mono-(ortho xenyl) phosphate and 5 grams of di-(para tert-butylphenyl) mono-(5-tert-butyl-2-xenyl) phosphate. This gave capsules comprising a high percentage of plasticizer, which were substantially harder than the capsules of Examples Nos. 5 and 6.

Example No. 9

Taking 10 grams of ethyl cellulose having a viscosity of about 250 centerpoises in 5% solution at 25° C. and 10 grams of benzyl cellulose of somewhat lower viscosity, I dissolved them in 80 c. c. of a solvent composed 80% of toluene and 20% of benzene. To this I added 5 c. c. of ethyl acetate, and added a mixed plasticizer composed of 5 grams of di-(para tert-butylphenyl) mono-(5-tert-butyl-2-xenyl) phosphate and 5 c. c. of di-butyl phosphate. The sheet formed of this composition was relatively soft and pliable.

Example No. 10

I dissolved 20 grams of ethyl cellulose having a viscosity of about 250 centerpoises in 5% solution at 25° C. in 75 c. c. of a solvent composed 75% of toluene and 25% ethyl alcohol. To this I added 5 c. c. of ethyl acetate and 10 c. c. of methyl abietate. The sheet formed of this composition was relatively soft and pliable.

In use of capsules made in accordance with my invention, I have found that capsules made in accordance with any of the cited examples, or the more general disclosure from which the examples are taken, are capable of retaining colloidal preparations of iodine and of bromine for indefinite periods of time without deterioration of the capsules. This is for the reason that the plastic compositions of which the capsules are made are substantially inert to dilute acids and alkalis, such as are encountered in the bodies of fowls and mammals. They are capable of retaining indefinitely other substances which have previously proven difficult to put up in appropriate dosages for administration.

When administered to a fowl, the capsules pass unaffected through the crop and glandular stomach of the fowl to liberate their contents in the gizzard of the fowl when mechanically broken therein. I have found no traces of the capsule substance in even the most finely divided form in the excreta of the fowls, and have discovered that this is due to the action of the enzymes existing in the digestive tract of fowls, posterior to the gizzard. While this fact is of minor importance in treating fowls, in the gizzards of which the capsules are mechanically broken, it is a substance of great importance in administering colloidal iodine to dogs and other mammals. I have found that in dogs and other mammals the effect of the enzymes encountered when the capsules first enter the intestinal tract so act to disintegrate the capsules, that their contents are effectively liberated in the intestines. I have noticed no trace of the capsule substance in the faeces of dogs to which the capsules have been administered.

It has been explained that the various ingredients, which go to make up the plastic compositions of which my capsules are formed, are of themselves relatively inactive chemically, and when brought together in the composition give a material for the capsule which is relatively inert and which has proven to be wholly inert to colloidal preparations of iodine and bromine. It is surprising that, being also inert to dilute acids and alkalis, the capsules nonetheless decompose under intestinal conditions sufficiently to liberate their contents in the intestines.

The capsule is useful in administering to human beings, as well as to other mammals, or to fowls. It is also useful in administering any medicinal, tonic, or nutritional substances which either react strongly with chemically unsaturated organic substances, or which it is desirable to pass unchanged through the stomach effectively to be released in the posterior digestive tract. Thus the capsule may usefully be employed for the administration of colloidal iron, colloidal manganese, colloidal copper, and in general for the administering of any astringent, antiseptic, tonic, or nutritional substance which should be delivered unaltered to the posterior digestive tract.

I claim as my invention:

1. An administration capsule inert to colloidal preparations of iodine and other halogens composed of substantially non-reactive film-forming components consisting essentially of a cellulose ether and a xenyl phosphate selected from the group consisting of di-phenyl mono-(ortho-xenyl) phosphate and di-(ortho-xenyl) mono-phenyl phosphate.

2. An administration capsule inert to colloidal preparations of iodine and other halogens composed of substantially non-reactive film-forming components consisting essentially of a cellulose ether and di-phenyl mono-(ortho-xenyl) phosphate.

3. An administration capsule inert to colloidal preparations of iodine and other halogens composed of substantially non-reactive film-forming components consisting essentially of a cellulose ether and di-(ortho-xenyl) mono-phenyl phosphate.

WILBERT MOODY WILSON.